United States Patent
Burman et al.

(10) Patent No.: US 9,866,045 B2
(45) Date of Patent: Jan. 9, 2018

(54) MOBILE CHARGING DOCK

(71) Applicants: Anthony Burman, San Diego, CA (US); Robert D. Heller, San Diego, CA (US)

(72) Inventors: Anthony Burman, San Diego, CA (US); Robert D. Heller, San Diego, CA (US)

( * ) Notice: Subject to any disclaimer, the term of this patent is extended or adjusted under 35 U.S.C. 154(b) by 59 days.

(21) Appl. No.: 14/938,943

(22) Filed: Nov. 12, 2015

(65) Prior Publication Data
US 2017/0141594 A1 May 18, 2017

(51) Int. Cl.
*H02J 7/00* (2006.01)
*B60R 16/00* (2006.01)

(52) U.S. Cl.
CPC .......... *H02J 7/0044* (2013.01); *B60R 16/00* (2013.01); *H02J 7/0027* (2013.01); *H02J 7/0045* (2013.01)

(58) Field of Classification Search
CPC .................................................. H02J 7/0044
USPC ....................................................... 320/115
See application file for complete search history.

(56) References Cited

U.S. PATENT DOCUMENTS

| | | | | |
|---|---|---|---|---|
| 4,944,694 A * | 7/1990 | Dorn | ...................... | H01R 13/72 439/501 |
| 5,596,479 A * | 1/1997 | Campbell et al. | ..... | H01R 13/72 307/150 |
| 5,847,541 A * | 12/1998 | Hahn | ...................... | H01R 27/00 320/111 |
| 6,017,228 A * | 1/2000 | Verbeek et al. | ........ | A47B 21/06 174/493 |
| 7,025,627 B2 * | 4/2006 | Rosenthal | ............ | H01R 25/003 439/142 |
| 7,130,190 B1 * | 10/2006 | Baker | ................... | G06F 1/1632 280/47.35 |
| 7,151,356 B1 * | 12/2006 | Chen et al. | ............. | G06F 1/263 320/107 |
| 8,080,975 B2 * | 12/2011 | Bessa et al. | .......... | H02J 7/0044 320/101 |
| 8,583,264 B2 * | 11/2013 | Nielsen et al. | ........... | F16L 1/11 361/679.01 |
| 2010/0085694 A1 * | 4/2010 | Nielsen et al. | ........... | F16L 1/11 361/679.08 |
| 2010/0145160 A1 * | 6/2010 | Cinqualbre et al. | .. | A61L 2/0088 600/300 |
| 2011/0248665 A1 * | 10/2011 | Smith et al. | ......... | G03H 1/2294 320/101 |
| 2016/0134140 A1 * | 5/2016 | Tittle et al. | ........... | H02J 7/0042 320/101 |

* cited by examiner

*Primary Examiner* — Sun Lin
(74) *Attorney, Agent, or Firm* — Jerry D Haynes; Law Office of Jerry D Haynes PA

(57) ABSTRACT

A mobile docking station that includes: a casing; a plurality of openings in the casing; a cord extending through each opening; a plug at a distal end of each cord; and a power cord extending from the casing, where the power cord supplies power to the cords. Preferably each cord is retractable back into each respective opening. In one particular embodiment, the casing preferably accommodates a tissue box and includes an opening to allow dispensing tissues from the tissue box.

6 Claims, 5 Drawing Sheets

MOBILE CHARGING DOCK

BACKGROUND OF THE INVENTION

Field of Invention

The present invention relates to a mobile charging dock that is portable and may conveniently be used in a motor vehicle.

Description of Related Art

Many individuals use mobile electronic devices such as cellular phones, smart phones, tablets, iPods or MP3 players. Many of these devices include rechargeable batteries that are charged by connecting to a typical charging connector. Because the electronic devices are portable these devices are commonly used in a motor vehicle and typically a power cord is provided that is connected into a DC outlet provided in the vehicle. However since mobile electronic devices are quite common if there are multiple individuals in a vehicle there would be multiple chargers needed to charge the multiple electronic devices. Therefore it would be advantageous to have a complete charging docking station that provided multiple charging outlets for a motor vehicle.

SUMMARY OF THE INVENTION

The present invention relates to a mobile docking station that includes: a casing; a plurality of openings in the casing; a cord extending through each opening; a plug at a distal end of each cord; and a power cord extending from the casing, where the power cord supplies power to the cords. Preferably each cord is retractable back into each respective opening. In one particular embodiment, the casing preferably accommodates a tissue box and includes an opening to allow the dispensing of tissues.

DETAILED DESCRIPTION

The present invention relates to a mobile docking station that is used to provide access to multiple charging connectors and is advantageously placed in a motor vehicle. The docking station in accordance with the present invention includes a plurality of charging plugs that provide a charging connection for a mobile electronic device. A main power plug is provided that inserts into a DC power outlet or socket in the motor vehicle. Once in place the docking station may provide a convenient source for connecting multiple electronic devices for charging purposes. An additional feature of the docking station is access to a tissue dispenser. One compartment of the docking station includes a small tissue box that allows for the dispensing of tissue for use by a consumer.

Figure 1:
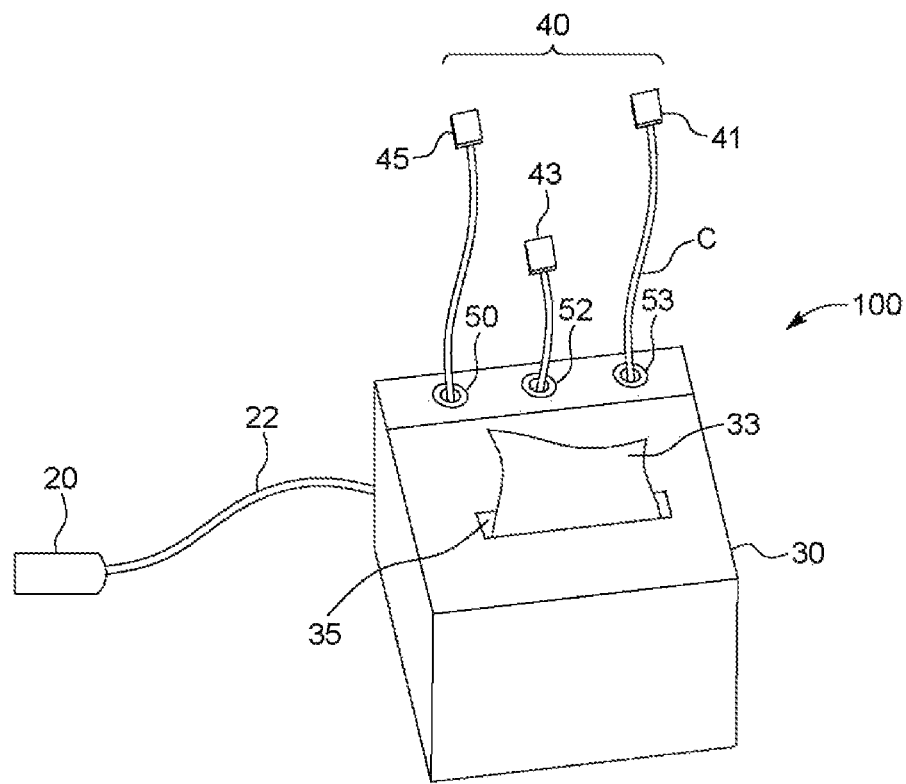
FIG. 1 depicts a mobile charging docking station in accordance with the present invention.

In reference to FIG. 1, a mobile docking station 100 is depicted. The mobile docking station 100 includes a power plug 20 at one end of a power cord 22. This power plug 20 is inserted into a DC socket of a motor vehicle and supplies a flow of power to a plurality of charging cables 40. Charging cables 40 include charging plugs for each cable, plugs 41, 43, 45. The cables 40 extend from openings 50, 52, 53 of the docking station 100. Although docking station 100 depicts three charging cables additional cables may be added and the design modified to include even more charging plugs as needed. In addition to providing access to charging plugs the docket station 100 includes an opening 35 for the dispensing of tissues 33. The docking station has a casing 30 that houses tissue in an opening provided in the casing. Further cables for each plug 41, 43, 45 extend from the casing 30. Preferably the casing is a cuboid and may be conveniently placed on the console of the motor vehicle.

Although not clearly shown the casing 30 may include a removable lid to allow for the insertion of additional tissue boxes in the opening provided. The cords are preferably retractable and once use is completed the cord retracts back into the casing 30 therefore avoiding any loose extending cords from the casing. The docking station therefore provides a stand-alone console for providing charging source for multiple mobile electronic devices.

Figure 2:
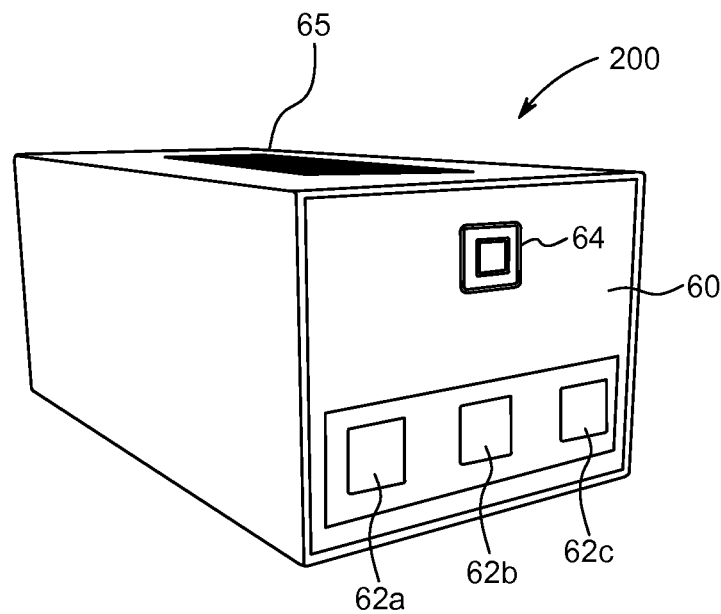
FIG. 2 depicts a second embodiment of a mobile charging docket station in accordance with the present invention.

In reference to FIG. 2, a second embodiment of a mobile docking station in accordance with the present invention is depicted. In this particular embodiment, a Mobile Docking Station 200 includes an opening 65 to allow user to access tissue within the docking station 200. Further the docking station 200 includes three openings 62a, 62b, 62c that allow for the user to access USB cords for charging purposes. A control button 64 is also shown on this front face 60 of the docking station 200.

Figure 3:
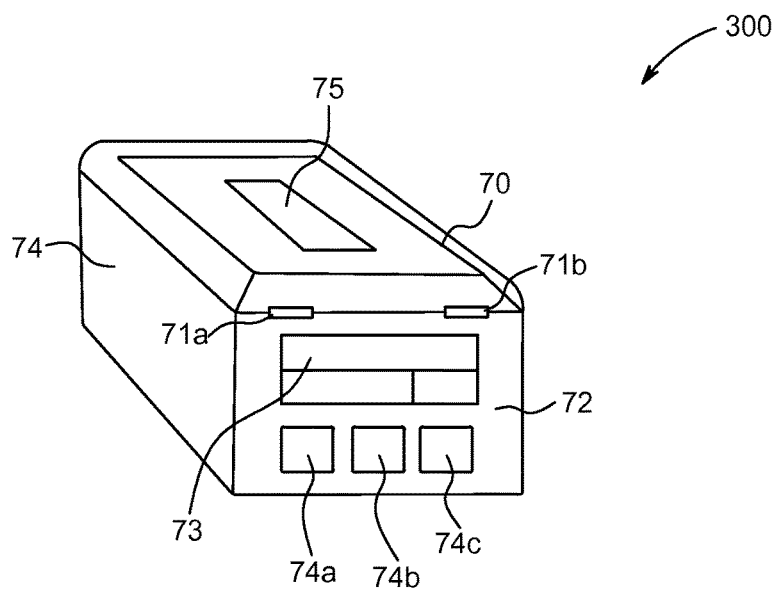
FIG. 3 depicts a third embodiment of a mobile docking station in accordance with the present invention.
Figure 4:
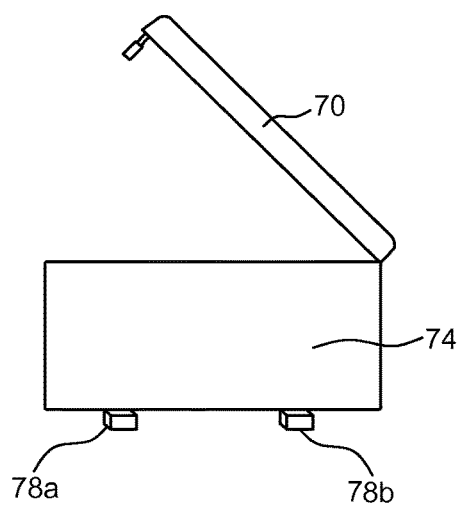
FIG. 4 depicts a side view of the third embodiment of the mobile docking station in accordance with the present invention.

In reference to FIG. 3, a third embodiment of the mobile docking station is shown. In this particular embodiment, a Mobile Docking Station 300 includes a lid 70 that includes an opening 75 along the top of the Mobile Docking Station 300. The opening 75 provides a means to access tissue contained within the docking station 300. The lid 70 is placed on hinges 71a, 71b that allow the user to open the Mobile Docking Station 300 as shown in FIG. 4. A side panel 74 is shown in FIG. 4 along with mounting brackets 78a, 78b along the bottom of the docking station 300.

Figure 5:
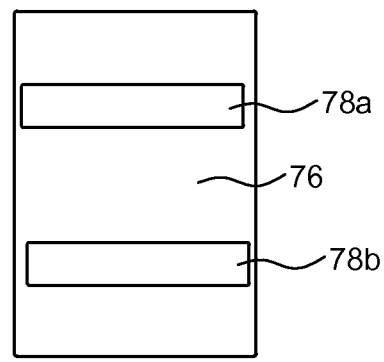
FIG. 5 depicts a bottom view of mobile docking station in accordance with the present invention.
Figure 6:
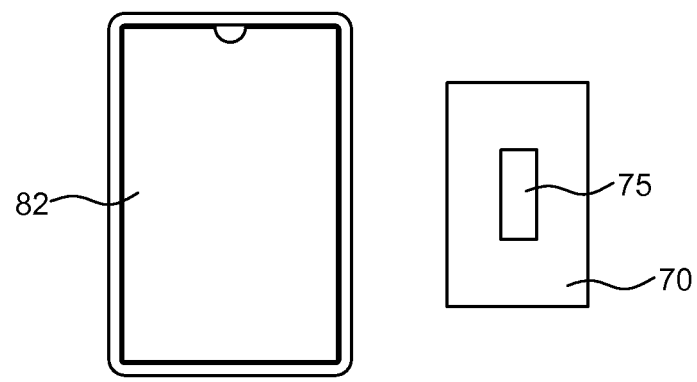
FIG. 6 depicts a top view of the mobile docking station with the lid removed exposing a tissue compartment of the mobile docking station.

The docking station 300 also includes a control panel 73 that enables the user to control various aspects on the docking station. Further openings 74a, 74b, 74c are shown that allow for the user to access USB connections to connect portable electronic devices for charging purposes. The control panel 73 may include various interfacing controls for the user such as blue tooth connectivity interfacing with vehicle speakers and general access to the controls of the connected electronic devices. In reference to FIG. 5, a view of a bottom panel 76 is shown, where the bottom panel 76 includes the mounting brackets 78a, 78b. FIG. 6 provides a view of a tissue compartment 82 of the docking station 300. The lid 70 is removed and exposes the tissue compartment 82 which is available for a user to place a box of tissue accessible through the opening 75 when the com compartment 82 is covered by the lid 70.

Figure 7:
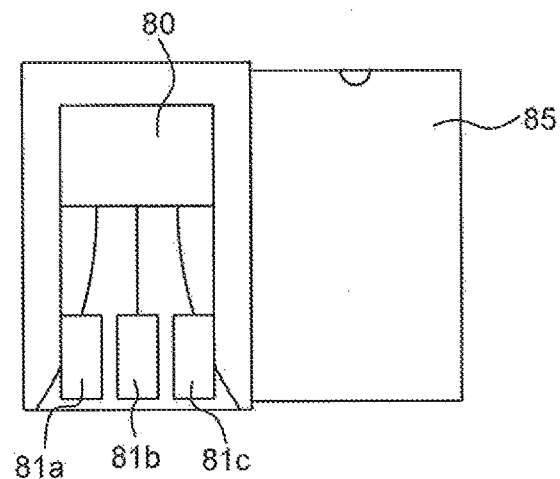
FIG. 7 depicts a top view of the mobile docking station exposing a charging unit for the mobile docking station of the present invention.
Figure 8:
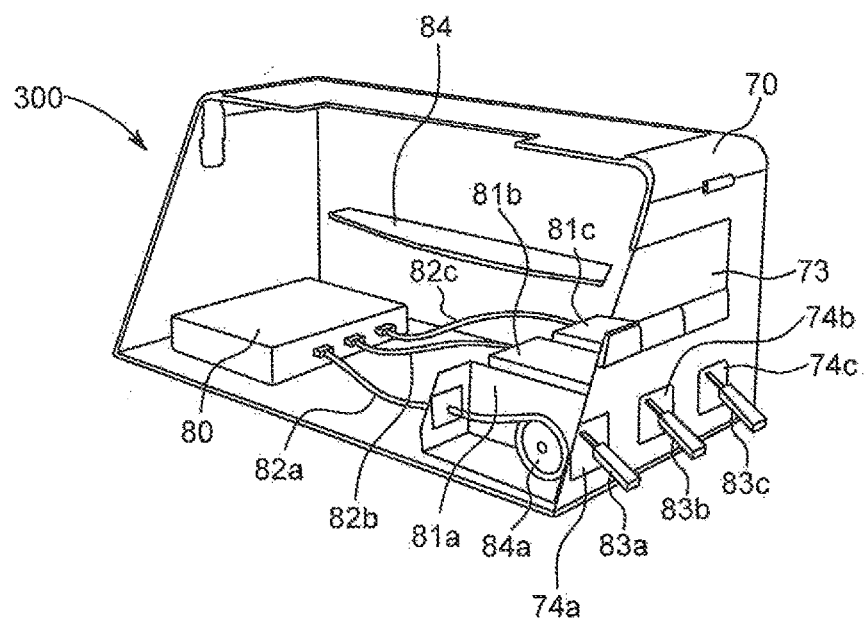
FIG. 8 depicts a sectional open view of the interior of the third mobile docking station in accordance with the present invention.

In reference to FIG. 7, a top view of the inside compartment of the Docking Station 300 is shown. Within this top inside view, a charging unit 80 is shown that provides power through the channels 81*a*, 81*b*, 81*c* of the interior compartment. A lid 85 is provided that covers this charging unit and channels that provides a connection to the portable electronic devices. A more detailed view of channels 81*a*, 81*b*, 81*c* is provided in FIG. 7. As shown in FIG. 7, the lid 70 is cut open to expose the interior. Further the side panel 74 is removed. Shown within the interior is a charging unit 80 that provides a connection to USB cords 82*a*, 82*b*, 82*c*. These cords 82*a*, 82*b*, 82*c* extend through channels 81*a*, 81*b*, 81*c*. Shown within the channel 81*a* is a spool 84*a* that allows cord 82*a* to wrap around the spool 84*a* and allow for a connector 83*a* to be exposed through the opening 74*a* of the Docking Station 300. This configuration provides for the refraction of the cord 82*a* when not in use onto a spool 84. Similar spools are provided in channels 81*b*, 81*c* although not shown. The instant invention has been shown and described in what it considers to be the most practical and preferred embodiments. It is recognized, however, that departures may be made there from within the scope of the invention and that obvious modifications will occur to a person skilled in the art.

What is claimed is:

1. A mobile docking station comprising:
   a. a casing;
   b. a plurality of openings in the casing;
   c. a cord extending through each opening, wherein each cord is retractable;
   d. a plug at a distal end of each cord; and
   e. a power cord extending from the casing, wherein the power cord supplies power to the cords.

2. The mobile docking station according to claim 1, wherein the casing accommodates a tissue box.

3. The mobile docking station according to claim 2, wherein the casing includes an opening to allow the dispensing of tissues from the tissue box.

4. A mobile docking station comprising:
   a. a casing;
   b. three openings in the casing;
   c. a cord extending through each opening, wherein each cord is retractable;
   d. a plug at a distal end of each cord; and
   e. a power cord extending from the casing, wherein the power cord supplies power to the cords.

5. The mobile docking station according to claim 4, wherein the casing accommodates a tissue box.

6. The mobile docking station according to claim 5, wherein the casing includes an opening to allow dispensing tissues from the tissue box.

\* \* \* \* \*